(12) United States Patent
O'Toole, Jr.

(10) Patent No.: US 8,451,711 B1
(45) Date of Patent: May 28, 2013

(54) METHODS AND APPARATUS FOR REDIRECTING TRAFFIC IN THE PRESENCE OF NETWORK ADDRESS TRANSLATION

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 2867 days.

(21) Appl. No.: 10/100,771

(22) Filed: Mar. 19, 2002

(51) Int. Cl.
*G01R 31/08* (2006.01)

(52) U.S. Cl.
USPC ............................ 370/216; 370/229; 370/392

(58) Field of Classification Search
USPC ................. 370/216, 217, 220, 221, 229, 230, 370/232, 392, 401
See application file for complete search history.

(56) References Cited

U.S. PATENT DOCUMENTS

| | | | | |
|---|---|---|---|---|
| 6,262,976 B1 * | 7/2001 | McNamara | | 370/254 |
| 6,650,641 B1 * | 11/2003 | Albert et al. | | 370/392 |
| 6,704,278 B1 * | 3/2004 | Albert et al. | | 370/216 |
| 6,751,191 B1 * | 6/2004 | Kanekar et al. | | 370/217 |
| 6,807,184 B2 * | 10/2004 | Gutknecht et al. | | 370/401 |
| 6,885,633 B1 * | 4/2005 | Mikkonen | | 370/217 |
| 7,269,132 B1 * | 9/2007 | Casey et al. | | 370/219 |
| 2002/0021661 A1 * | 2/2002 | DeGrandpre et al. | | 370/219 |
| 2003/0048746 A1 * | 3/2003 | Guess et al. | | 370/219 |
| 2003/0058839 A1 * | 3/2003 | D'Souza | | 370/352 |
| 2003/0088698 A1 * | 5/2003 | Singh et al. | | 709/239 |
| 2006/0120366 A1 * | 6/2006 | Jayasenan et al. | | 370/389 |
| 2006/0146729 A1 * | 7/2006 | Krautkremer et al. | | 370/252 |

OTHER PUBLICATIONS

ExtremeWare: "ExtremeWare Software User Guide", Software Version 6.1, Apr. 2000.*

* cited by examiner

*Primary Examiner* — Kwang B Yao
*Assistant Examiner* — Nguyen Ngo
(74) *Attorney, Agent, or Firm* — Patterson & Sheridan, LLP

(57) ABSTRACT

The invention is directed to techniques for processing messages to be transferred from a first network to a second network, the method comprising the steps of receiving a message at a second data communications device coupling the first and second networks, determining that the message is associated with a data path through a first data communications device that couples the first and second networks independently from the second data communications device and processing the message to maintain a connection associated with the message, the connection existing between a first computerized device operating in the first network and a second computerized device operating in the second network.

42 Claims, 9 Drawing Sheets

METHODS AND APPARATUS FOR REDIRECTING TRAFFIC IN THE PRESENCE OF NETWORK ADDRESS TRANSLATION

BACKGROUND OF THE INVENTION

Computer networks such as the Internet use various techniques and mechanisms for routing requested packets over data links in response to content requests. In some cases, a routing algorithm may re-configure or re-route pre-established paths in order to enact new routing patterns. Such changes may be undertaken as a result of modifications to the capacity of a particular network link or server, the addition or elimination of network paths or server facilities, or other related reasons, failures, and so forth. In other cases, network devices are employed which have the ability to re-route network traffic, as needed, between different server alternatives that may each hold desired packets, such as, for example, duplicate or cache content servers.

Network Address Translation (NAT) is a method for translating a first network address used in a packet being transferred from one network location on a first network that uses a first set of addresses to a second address usable on a second network that uses a second set of addresses. For example, one use of NAT is to translate the destination address of a packet, which a LAN receives from the Internet, from the publicly known address of one NAT device coupling in the LAN to the Internet to an address of any of multiple devices existing in the LAN whose addresses are not publicly known, to which the packet must travel. After changing the address to a new address, the NAT device can forward the packet onto the LAN using the translated address.

In some cases, a TCP port number of a packet may provide information used by the NAT device to perform the translation of the address of the packet to the new address. As an example, if a destination computer system on a network receives a packet requesting data and containing an address translated as described above, the destination computer system can return data packets to the NAT device (e.g., the device that changed the packet to contain the translated address). The destination computer system does so by creating response packets that reference the source address and port information within the packet header that identify the NAT device as the originating device of the original packet requesting the data. When these response packets are routed back to the NAT device, the NAT device can compare the TCP port number information to NAT table entries to determine a true destination device on another network (e.g., a LAN) to which that packet is then forwarded.

Another conventional technology related to the present invention allows a network such as a Local Area Network (LAN) to interconnect with another network such as the Internet through multiple pathways. Such networks are referred to as multi-homed networks. Essentially, a multi-homed network such as a LAN couples to another network in multiple locations referred to as gateways. As an example, a large national corporation may have an internal corporate network data links extending between many cities (e.g., over leased lines). Due to the large nature of this network, in order to allow communications with the Internet (i.e., with computers outside of the corporate network), the network can have multiple gateway connections to the Internet, each located in diverse geographic locations. Each gateway can allow traffic to be routed to and from the corporate network and the Internet. In some cases also, there can be a collection of interconnected LAN's, a metropolitan area network, a larger campus network or a corporate wide area network, etc. In another case of a multi-homed network, a single LAN is connected to multiple upstream ISP links in a single location.

The NAT approach is described in RFC 1631 of the Internet Engineering Task Force. The disclosure of RFC 1631, "The IP Network Address Translator (NAT)," is hereby incorporated in its entirety herein by reference.

SUMMARY OF THE INVENTION

Unfortunately, there are deficiencies in the conventional methods for communication of content requests between a requesting location and the destination server providing the requested content when such computers are on different networks coupled via multi-homed connections. Such situations may include failure of a connection due to facility failures, overloading conditions of one or more network nodes or servers, connections failing due to any of a variety of other causes and factors and other situations, as well. As a consequence of these occurrences, transmission of requests for content and/or the requested content may either be temporarily or permanently delayed. Such delays may occur even in cases where adequate alternative routes (e.g., a second path of a multi-homed network) with spare or optional capacity exist that could otherwise have been utilized to handle transmission of the content requests and content.

In some cases, the facility or connection failures, overload conditions, and/or other failures or disruptions, etc. are only temporary, but result a longer term or permanent delay of transmission of the content request and/or content due to the lack of a viable alternative route for continuing transmission during the disruption. In other words, the inability to provide an alternative method of transmission for one or two packets within a multiple-packet transmission may result in a failure of the whole, much longer transmission, even though only one or two packets failed (e.g., were lost) in transmission. The resulting sub-optimal condition represents a lost opportunity with respect to network performance.

Another deficiency with the operation of multi-homed networks is that multiple gateways operating in a multi-homed network might require the use of NAT. Multi-homed networks that have gateways that use NAT, called NAT gateways, can fail to maintain an existing connection between two computers operating in the different networks (e.g., one in a multi-home LAN and one in the Internet) should routing conditions occur during the life of a connection between these computers which causes packets associated with the connection, which were initially being routed through one NAT gateway, to now be routed to another NAT gateway. In other words, if a connection exists between a first computer in a first network such as a LAN to a second computer in a second network such as the Internet, and the LAN is multi-homed to the Internet with multiple NAT gateways, packets traveling over the connection may be initially routed through a first NAT gateway between the LAN and the Internet.

However, if a change in routing conditions occurs within the LAN, packets associated with the connection that are transmitted from the first computer onto the LAN may later be routed to a second NAT gateway between the LAN in the Internet. This rerouting may occur, for example, due to a short-term or a long-term disruption, such as congestion, that occurs within the LAN. A problem arises since NAT state information within the first NAT gateway might be required to successfully maintain the connection between the first and second computer systems. As an example of such NAT state information, NAT TCP port numbers and/or NAT network address mapping may be known and expected within packets sent and received over the TCP connection by the first and second computer systems. However, since the disruption such as congestion causes the LAN to reroute a series of packets associated with the connection to a second NAT gateway in the LAN for transport to the Internet, the second NAT gateway will be unaware of the NAT state information used by the first NAT gateway to provide packets over the connection.

As a result, the second NAT device may operate improperly. By way of example, the second NAT gateway may attempt to set up, establish or otherwise configure new NAT connection information within itself for these re-routed packets in an attempt to route these packets onto the Internet for receipt by the destination computer system. In some cases, such attempts may fail altogether since the re-routed packets received by the second NAT gateway will not contain proper TCP connection establishment information, such as a TCP synchronization (e.g. in the initial packet of a TCP session, the "SYN" bit of the packet header is set to "on" or "1") which is required to initiate a TCP connection. Since these rerouted packets are sent mid-stream after establishment of the end-to-end connection between the first and second computer systems, the second NAT gateway might return an error to the first computer system that originated these rerouted packets since the first re-routed packet is not a connection setup packet (e.g., a TCP SYN packet).

If the second NAT gateway device is capable of establishing NAT state information for packets transferred over an existing TCP connection (i.e., if the NAT device is liberally configured such that TCP synchronization sequences are not initially required to establish NAT translations in the second NAT gateway), the second NAT gateway may be successful in transferring the rerouted packets onto the Internet for receipt by the destination device. However, the destination (i.e., the second) computer system on the Internet that receives such packets from the second NAT gateway may become confused since such packets are perceived to have arrived from a source device (i.e., the second NAT gateway) that is different from the source device (i.e., the first NAT gateway) from which former packets, that were not rerouted in the LAN and which thus passed through the first NAT gateway, arrived. In other words, re-routed packets received by the second computer system which were sent from the LAN from the second NAT gateway may have an unrecognized source address in relation to connection information maintained by the second computer system. When this happens, the second computer will issue a "reset" (e.g. accomplished by setting a "RST" flag in a TCP packet) TCP packet to the first computer. Upon receiving the TCP "reset" packet from the second computer, the second NAT gateway will modify that packet and return it to the first computer. The packet thus received by the first computer appears to be resetting the connection that the first computer had properly established (i.e. via the first NAT gateway).

To this end, conventional techniques for operating network address translation in multiple NAT gateways operating within multi-homed networks fail to address such deficiencies in an adequate manner.

Embodiments of the invention allow network address translation (NAT) to operate in a plurality of data communications devices (two or more) that operate as NAT gateways that couple two or more networks together. As an example, consider a first network such as a LAN and a second network such as the Internet that are independently coupled by first and second data communications devices that operate as gateways between the first and second networks. Each data communications device may operate NAT in order to insulate the networks from addressing assignments made in each respective network. If a first computer system operating in the first network establishes a connection such as a TCP connection with a second computer system operating in the second network, messages (e.g., packets) associated with this connection may initially be routed through a data path in one of the data communications devices (e.g., the first data communications device) that couples the two networks. The data path within the first data communications device can be established and may include NAT state and connection information that the first data communications device uses to perform NAT operations on the messages as they flow across this data path for the connection between the first and second computer systems on the different networks.

If a routing condition occurs within one of the networks, such as the LAN for example, messages transmitted, for example, from the first computer system may now be rerouted within the LAN to an advertised route to the second network that is provided by the second data communications device. In other words, the second data communications device may advertise a second route to get to the Internet which may now be more favorable than the first route through the first data communications device that was initially used to process packets for the connection between the first and second computer systems. However, since the first data communications device has been performing NAT operations on messages that traveled on the connection between the first and second computing systems, the second computing system (as an example) may maintain and expect connection state information for future messages which is specific to the NAT operations that were being performed by the first data communications device.

Embodiments of the invention allow the second data communications device to receive the message (e.g., a rerouted packet) and determine that a message is associated with a data path between the first and second networks that already exists within the first data communications device. In other words, embodiments of the invention allow the second data indications device to determine that the first data communications device is currently primarily responsible for transferring messages related to the connection between the first and second computer systems. Techniques for making this determination will be explained in detail herein. Upon making this determination, embodiments of the invention allow the second data communications device to operate according to a number of different options in order to make all attempts to maintain the connection between the first and second computer systems (i.e., so that the connection will not be lost).

To accomplish this, according to some embodiments of the invention, the second data communications device can transfer or tunnel the messages to the first data communications device such that the first data communications device can perform NAT operations on the tunneled messages as if they had been initially routed to the first data communications device through the LAN.

In other embodiments of the invention, the second data communications device can drop the messages it receives for which a data path exists through another data communications device coupling the first and second networks. By dropping such messages, the routing condition in the LAN which causes the messages to be routed to the second data communications device may disappear before a timeout is experienced by the first computer system that originated the messages. Accordingly, the first computer system can attempt to retransmit the messages onto the LAN at which point they will then be correctly routed to the first data communications device for proper processing since the routing condition may have disappeared by this point in time (e.g., may have been a temporary route flap).

In other embodiments of the invention, a hybrid configuration is implemented in which the second data communications device can initially forward, transfer, or otherwise propagate the messages to the first data communications device (as explained above) for a period of time. The second data communications device can continually monitor a set of metric indications that indicate which data communications device is preferred to handle messages associated with the connection between the first and second computer systems. As more and more messages arrive at the second data communications device in the event of a long-term routing condition that persistently exists within the LAN, the metric indications, which essentially provide a ranking or rating between the various data communications devices that couple the first and second networks, will begin to change in favor of the second data communications device (i.e., due to the continuous arrival of more and more re-routed messages). At a point in time at which the second data communications device becomes the preferred device for transferring messages associated with a connection between the first and second networks, the second data communications device can stop tunneling or otherwise forwarding the messages to the first data communications device and can establish a data path of its own between the first and second networks for messages associated with the connection.

This may entail borrowing or otherwise obtaining data path information such as NAT connection state information from the first data communications device such that the second data communications device can establish a data path for the messages to be transferred through the second data communications device which allows the connection between the first and second computer systems to not be disrupted even though the messages sent over the connection are now being transferred through another (i.e., the second) data communications device that links the first and second networks. Further details of embodiments of the invention will be summarized below and discussed in detail in the detailed description section in relation to the attached Figures.

The invention is directed to distributed techniques for translation of addresses of content requests propagated over a network and of the addresses of the returned content. In particular, the embodiments of the invention provide methods and mechanisms by which network devices such as NAT gateways operating in a multi-homed network can handle re-routed packets via a different route while maintaining a connection between the requesting device and the original request destination device.

In other embodiments, the second data communications device transfers the message to the first data communications device such that the first data communications device can utilize the data path to forward the message on the connection between the first computerized device and the second computerized device. The second data communications device is thereby able to transmit a message via the first data communications device.

In another embodiment, the second data communications device operates a forwarding protocol to forward the message from the second data communications device to the first data communications device. Such a forwarding protocol (e.g., a tunneling protocol) can efficiently transmit messages between the second and first data communications devices.

In still another embodiment, the second data communications device utilizes the data path from the first data communications device to transfer the message from the first network to the second network through the second data communications device.

In yet another embodiment, the second data communications device obtains the data path associated with the first data communications device and configures the second data communications device with the data path. The second data communications device then transfers the message through the second communications device to the second network using the data path in order to maintain the connection associated with the message between the first computerized device operating in the first network and the second computerized device operating in the second network. Accordingly, the data communications device is able to use the data path information obtained in such a manner that the second communications device will transmit messages via an appropriate transmission path.

In another embodiment, the data path is network address translation information in the first data communications device related to the connection associated with the message between the first and second networks. Network translation information is used to change the destination address of packets in order to modify the path that such packets will follow to reach a designated device in the second network.

In another embodiment, the data communications device maintains a set of metric indications identifying a data communications device from a plurality of data communications devices, which each independently couple the first and second networks (e.g., as NAT gateways), that is primarily responsible for transferring the messages associated with the connection between the first and second networks. The metric indications can be used to determine which data communications device may historically have been the most used or is currently favored to transmit messages between the two networks for a particular connection.

In another embodiment, a metric indication of the set of metric indications is a count of the messages processed (e.g., received by) by the data communications device on the data path of the communications device. A count of messages can serve as a straightforward measure of traffic handled by the data communications device for a connection.

In another embodiment, a second data communications device in response to receiving the message, increments a message count associated with the second data communications device. The message count indicates an amount of messages associated with the connection received by the second data communications device. By incrementing the message count for a particular data communications device, it is possible to identify the preferred data communications device for transmission of messages for a particular connection under the circumstance of changing network conditions.

In still another embodiment, the second data communications device identifies, based on the message count, which data communications device from the plurality of data communications devices maintains a data path that is preferred for transmitting the message to the second network. Selecting the data path having the highest message count ensures that the data path utilized for message transmission is the path which historically has handled the most traffic.

In another embodiment, the second data communications device repeats the steps of receiving, determining and processing for a first set of messages until the step of determining determines that the second data communications device should be primarily responsible for transferring the messages associated with the connection between the first and second networks. The second data communications device then repeats the steps of receiving, determining and processing for a second set of messages. The step of processing for the second set of messages processes the second set of messages using data path through the second data communications device. In other words, as the first set of messages are tunneled for transmission through the first data communications device, the second data communications device is able to monitor the metric indications to determine when the second data communications device becomes the most used data communications device for transmission of messages between the same two locations in the first and second networks. In turn, that observation can become the basis for identifying that the second data communications device should be the preferred data communications device to handle future traffic (e.g., the second set of messages) between the same two locations.

In yet another embodiment, the second data communications device transfers each message of the first set of messages to the first data communications device such that the first data communications device can utilize the data path to forward each message of the first set of messages on the connection between the first computerized device and the second computerized device. Transferring messages to the first data communications device permits transmission using the same NAT information that the first data communications device would have used if the first data communications device had received the messages directly itself.

In another embodiment, the second data communications device declines to forward (e.g., drops) each message of the first set of messages received by the second data communications device to the second computerized device operating in the second network. Accordingly, a transmission protocol, upon recognizing that the destination computerized device has not received an anticipated message (e.g., packet), notifies the requesting device to re-send the request.

In another embodiment, the second data communications device maintains a set of metric indications identifying a data communications device from a plurality of data communications devices, which each independently couple the first and second networks, that is primarily responsible for transferring the messages associated with the connection between the first and second networks. In the step of determining, when the second data communications device identifies that it should be primarily responsible for transferring the messages associated with the connection between the first and second networks, the second data communications device identifies that a metric indication associated with the second data communications device (i.e., from the set of metric indications,) identifies that second data communications device that is preferred for transmitting the message to the second network. Using metric indications is an effective way to quantitatively identify the preferred source/destination transmission path through multiple data communications devices.

In yet another embodiment, the second data communications device obtains a metric indication from a set of metric indications. The metric indication identifies a data communications device, from a plurality of data communications devices, that maintains a data path that is preferred for transmitting the message to the second network. Because data communications devices are allowed to access data path information (e.g., NAT connection info) from other data communications devices, the data path information storage and data path information can be divided up between multiple data communications devices thus reducing the storage and processing burden for individual data communications devices.

In another embodiment, the data path is network address translation information in the first data communications device related to the connection associated with the message to be transferred between the first and second networks. The network address translation information can be employed to change the destination address information of a message or packet and thereby change the message or packet transmission path.

In still another embodiment, the second data communications device declines to forward (i.e., drops) the message received by the second data communications device to the second computerized device operating in the second network. This is a less processing-intensive method of responding to packets that are not able to travel over their initially-designated transmission path.

In another embodiment, the second data communications device declines to forward the message received if the message is not an initial message (e.g., is not a TCP SYN packet) associated with the connection between the first and second networks. Messages received by the second data communications device that are not an initial message may reach the second data communications device following the failure of transmission of earlier messages via the first data communications device and have an increased likelihood that their transmission will fail because of the failure of the earlier component message(s).

In yet another embodiment, the second data communications device declines to forward the message received if the second data communications device determines that the message is associated with a data path through a first data communications device. By declining to forward messages associated with a first data communications device when they are received by the second data communications device, processing by the second data communications device is reduced. Completion of transmission of such messages is relegated to the repeated transmission of failed messages controlled by the underlying transmission protocol.

In another embodiment, the second data communications device declines to forward the message received if network address translation information in the second data communications device is not associated to the received message. By doing so, network address translation is only undertaken by the second data communications device in cases where the second data communications device already holds network address translation information needed to forward the message rather than to obtain the network address translation information from other sources.

In still another embodiment, the second data communications device maintains a set of metric indications identifying a data communications device from a plurality of data communications devices, which each independently couple the first and second networks, that is primarily responsible for transferring messages associated with the connection between the first and second networks. The set of metric indications can be used to later determine which data communications device of a multiple of data communications devices is primarily responsible for one or more messages.

In another embodiment, the data communications device randomly performs one of options of transferring the message to the first data communications device such that the first data communications device can utilize the data path to forward the message on the connection between the first computerized device and the second computerized device and of declining to forward the message received by the second data communications device to the second computerized device operating in the second network. In this manner, some packets are tunneled while others are dropped. This allows the connection to remain alive or intact, while slowing it down a bit.

In yet another embodiment, the data communications device delays transferring the message to the first data communications device by an amount of time such that messages handled do not exceed a selected volume.

Other embodiments of the invention include a computer system, such as a data communications device (e.g., router, switch, NAT gateway, and the like), computerized device, or other device configured with software and/or circuitry to process and perform all of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the memory system is encoded with a connection handler application that when performed on the processor, produces a connection handler process that causes the computer system to perform any and/or all of the method embodiments, steps and operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured to operate as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

The methods embodiments of the invention may be implemented by computer software and/or hardware mechanisms within a data communications device apparatus. It is to be understood that the system of the invention can be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
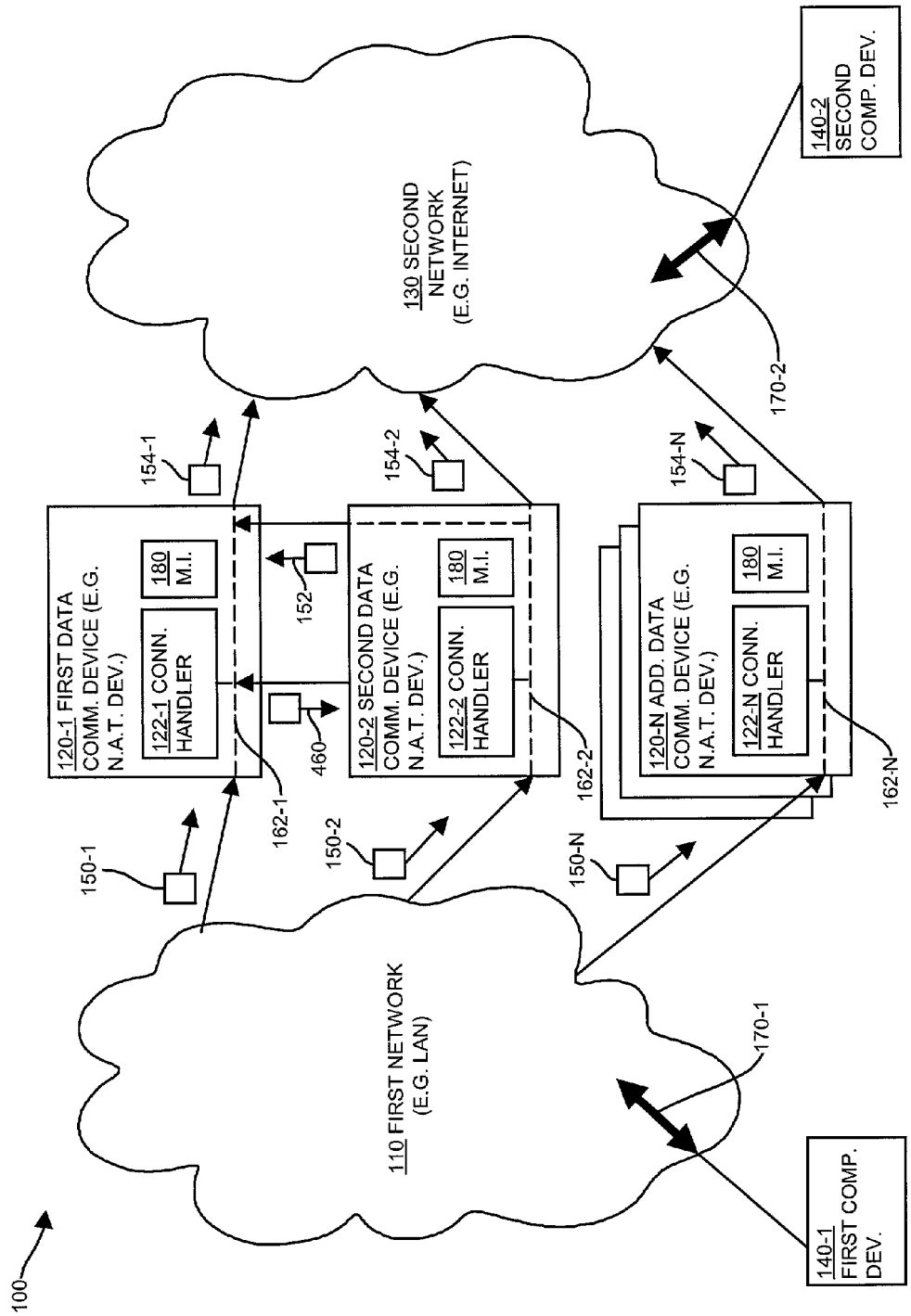
FIG. 1 is a system for transmission of data packets or messages in the event of a failure of a network transmission path according to one example embodiment of the invention.

Embodiments of the invention operate within data communications devices and provide mechanisms and techniques for processing messages to be transferred from a first network to a second network coupled by the data communications devices. The data communications devices may be, for example, NAT gateway devices for a multi-homed LAN. As an example operation of one embodiments of the invention, consider a first computing device operating in a first network (e.g., a client in a LAN) that is in communication with a second computing device operating in a second network (e.g., a server on the Internet) in which the first and second networks are coupled by two or more data communications devices (e.g., NAT gateways) equipped with embodiments of the invention. In other words, assume that there is an existing connection (e.g., TCP connection) between the first and second computing devices. Further assume that the first network initially routes messages (e.g., packets of data) through the first data communications device which performs a NAT operation on those messages and forwards the messages to the second computing device.

During the life of the connection between the first and second computing devices, a routing condition may occur in the LAN such as congestion or a failure of some sort that causes the LAN to begin to route messages associated with the connection to the second data communications device that couples the LAN to the Internet. In operation of embodiments of the invention, the second data communications device receives a message and determines that the message is associated with a data path through a first data communications device that couples the first and second networks independently from the second data communications device. In other words, the second data communications device that receives message(s) (due the change in routing conditions in the LAN) associated with the pre-existing connection can determine, as will be explained herein, that the messages are associated with the connection for which a data path exists in (i.e., through) another data communications device (i.e., the first data communications device) coupling the first and second networks. In response to this determination, the second data communications device processes the message(s) to maintain the connection associated with the message(s). As a result, the second data communications device is able to maintain a connection between a first and second network.

Depending upon which embodiments of the invention are in use, some embodiments are capable of transferring the messages back to the first data communications device such that the first data communications device can forward the messages onto the second network, just as it did for previous messages associated with the connection (i.e., messages transferred over the connection prior to the change in routing conditions within the LAN). As an example, when the second data communications device receives rerouted messages for which a data path such as NAT translation information exists within a first data communications device, the second data communications device can tunnel the message(s) over the LAN back to the first data communications device.

In an alternative configuration, another embodiment of the invention allows the second data communications device to drop a message that arrives for transfer to the second network when the second data communications device determines that another data communications device has a data path related to that message (i.e., supports a connection upon which those messages are transferred). When the second data communications device drops the message, a timeout may occur within the first computing device that originated the message which will cause the first computing device to retransmit another copy of the message. Since this processing takes time, the routing conditions within the LAN that caused the message to be rerouted to the second data communications device (i.e., the second NAT gateway) may have changed again or may have disappeared such that the copy of the message retransmit from the first computing device will now be routed to the first data communications device which is already configured with NAT translation information associated with a connection related to the message.

Embodiments of the invention further provide for the ability of data communications devices that link the first and second network (e.g., as NAT gateways) to track, maintain or otherwise monitor a set of metric indications that identify which data communications device is primarily responsible for transferring messages associated with a connection between the first and second networks. This allows the data indications device that receives a message to make a determination if this data communications device itself is the device that should be responsible for forwarding the message between two networks. The set of metric indications can be constantly updated and can be based in one configuration upon a number of messages or a message count that indicates how many messages associated with a particular connection are received in each data communications device over a predetermined period of time. Such metric indications can be maintained, for example, in a table that is distributed between the data communications devices. Accordingly, when a data communications device receives a message, the data communications device can consult a set of metric indications to determine which data communications device from the set of available data communications devices that link the first and second network is primarily responsible for handling messages associated with that connection.

In hybrid embodiments of the invention, a second data communications device can begin to receive a set of messages associated with a connection. This first set of messages may be a group of messages that are rerouted to this second data communications device as a result of a routing condition that occurs within the LAN. Prior to this routing condition, messages associated with the connection were being routed to a first data communications device that couples the first and second networks into which there was a previously established data path (i.e., has configured NAT translation information) between the first and second networks. As the messages arrive at second data communications device, the set of metric indications identifying which data communications device is preferred for handling messages associated with a connection between the first and second networks begins to change. However, before the metric indications associated with the second device indicate that the second data communications device is preferred, the second data communications device can transfer all messages in the first set of messages, such as by totaling such messages, back to the first data communications device.

In situations where the routing condition is somewhat persistent in the LAN, at some point in time the metric indications (which may be based on a count of the number of messages received in each data communications device for a particular connection) for the second data communications device may change so much such that the metric indications indicate that the second data communications device (as opposed to the first) is now preferred for handling message traffic associated with the connection between the first and second networks. At this point, these hybrid embodiments of the invention can stop transferring or tunneling messages associated at the connection to the first data communications device and instead can establish a data path through the second data communications device for these messages to be transferred between the first and second networks. As will be explained in more detail, one such embodiment of the invention is capable of having the second data communications device borrow or otherwise obtain connection information (e.g., NAT translation information) from the first data communications device such that it may continue to support the connection between the first and second networks while avoiding the connection failure between the first and second computing devices. Additional details concerning embodiments of the invention will now be described with respect to the attached Figures.

FIG. 1 shows a system 100 for transmission of messages 150,154 in the event of a failure of a NAT network transmission path according to one embodiment of the invention.

The system 100 includes a first and second network 110, 130 respectively (Only two networks are shown in the figure in order to simplify depiction of the system. However, more than two networks are possible.), a first, second and additional data communications devices 120-1, 120-2, 120-N each having a connection handler 122-1, 122-2, 122-N, and first and second computerized devices 140-1, 140-2 that are connected to the first and second networks 110, 130 via network connections 170-1 and 170-2 respectively. The system 100 also illustrates a series of messages (e.g., also referred to as requests, herein) including messages 150 (e.g., 150-1, 150-2, 150-N) sent through data communications devices 120 over data paths 162 (e.g., 161-1, 161-2, 162-N).

Tunneling messages 152, and data path information 460 are exchanged between the data communications devices 120. Messages 154 (e.g., 154-1, 154-2, 154-N) are forwarded by data communications devices 120 to the second network 130.

The system 100 forwards a message 150-1 from the first network 110 to the second network 130. In the event of a second data communications device 120-2 receiving a message 150-2 originally destined for transmission via another data communications device (e.g., a first data communications device 120-1), the second communications device 120-2 upon recognizing that the message 150-2 is associated (e.g., was originally transmitted through) the first data communications device 120-1, processes the message 150-2 in such a manner that the second communications device maintains a connection 170 between the first and second computer systems.

Figure 2:
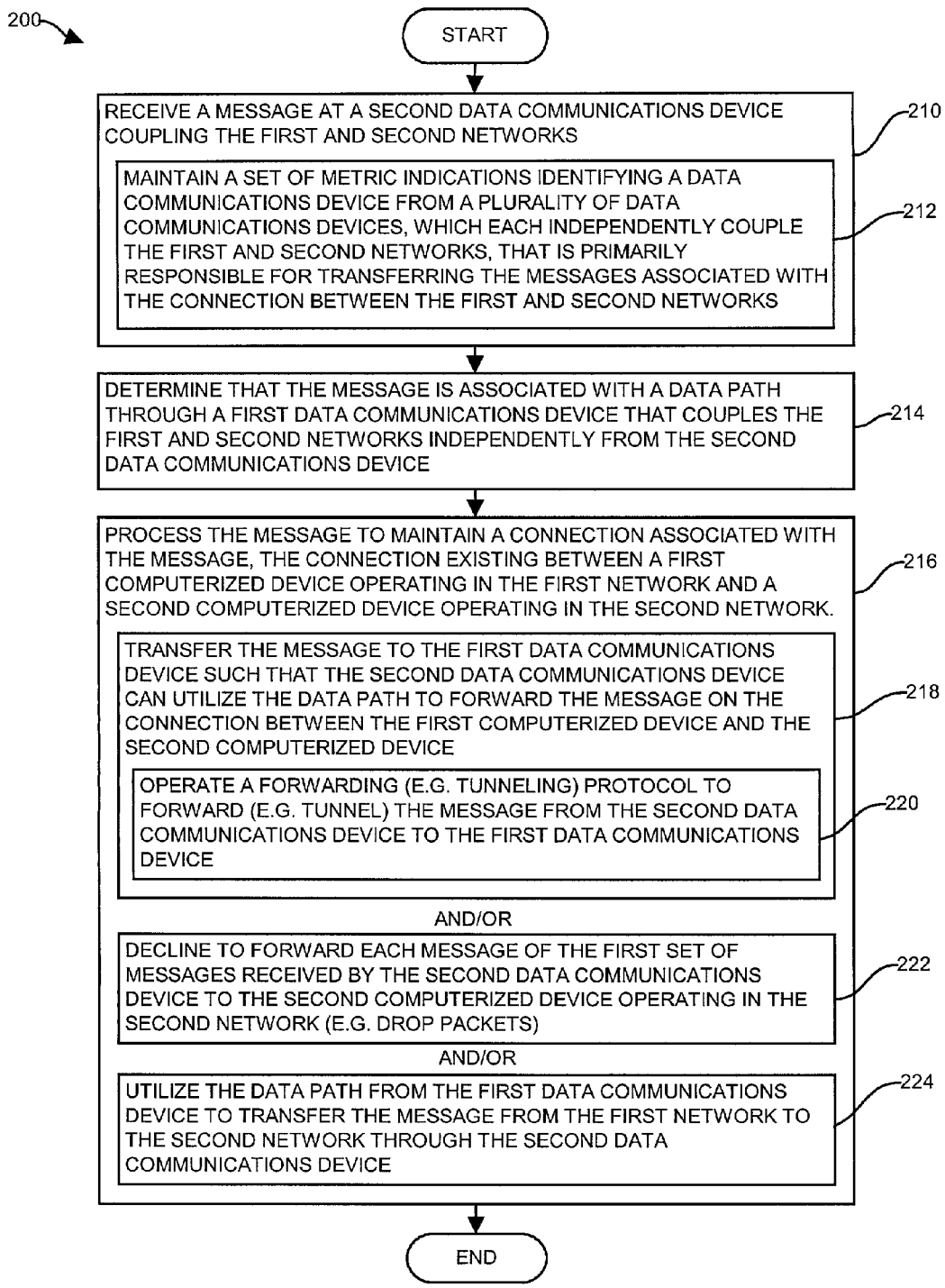
FIG. 2 is a flow chart of a procedure for transmission of data packets or messages in the event of a failure of a network transmission path according to one embodiment of the invention.

FIG. 2 is a flow chart of a procedure 200 for processing of messages between a first network and a second network according to one embodiment of the invention.

In step 210, a second data communications device 120-2 coupling the first and second networks 110, 130, respectively, receives a message 150-2 associated with the connection 170. Initially, a message 150-1 also associated with the connection 170 may have been transmitted via the first data communications device 120-1 toward a destination within a second network 130. However, should a path in the network 110 to the first data communications device 120-1 be non-operational, an alternative message 150-2 may travel to the second communications device 150-2.

In step 212, the second data communications device 120-2 maintains a set of metric indications 180 identifying one data communications device 120 from a plurality of data communications devices 120-N, which each independently couple the first and second networks 110, 130, that is primarily responsible for transferring the messages 150 associated with the connection between the first and second networks 110, 130. The metric indications 180, for example, may be counts or other measurements of the number of messages 150 that have been received at any data communications device 120.

The data communications devices 120 track and use metric indications 180 for various message source/destination combinations (e.g., based on packet header information) to identify the preferred path for transmission of messages 150 between the first 110 and second 130 networks. The metric indications 180 one stored in a table on one or more of the data communications devices 120.

A data communications device 120 may be configured to communicate with other data communications devices 150 in order to extract or obtain data path information from other data communications devices 120 for the purpose of preferred alternative paths for transmission of messages 150. Other details about the metric indicators and their usage in conjunction with data path information (See FIG. 4, 460) will be provided later in the description of tables used to store data path information (See FIG. 4, 460).

In step 214, the second data communications device 120-2 determines that the message 150 is associated with a data path 162-1 through a first data communications device 120-2 that couples the first and second networks 110, 130 independently from the second data communications device 120-2. Upon receipt of a message 150-2, the second data communications device 120-1 can use information provided as part of the message 150-2 (e.g., the source and destination of a packet) along with other information (e.g., information from metric indications) to determine if the message 150-2 was originally designated to be transmitted via another data communications device (e.g., first data communications device 120-1).

In step 216, the second data communications device 120-2 processes the message 150-2 to maintain a connection associated with the message 150-2, the connection existing between a first computerized device 140-1 operating in the first network 110 and a second computerized device 140-2 operating in the second network 130. If the data communications device (e.g., the second data communications device 150-2) determines that the message 150-2 was originally destined to travel via a different data communications device (e.g., the first data communications device 150-1 or another data communications device 150-N), translation of the destination network address of the message 150-2 may be necessary for the data communications device 120-2 to communicate the message 150-2 over a same part of the network that the message 150-2 would have been communicated over if there had not been a failure of at least part of the original communications path.

In step 218, the data communications device (e.g., the second communications device 120-2) transfers the message 152 to the first data communications device 120-1 such that the first data communications device 150-1 can utilize the data path 162-1, 154-1 to forward the message 154-1 on the connection between the first computerized device 140-1 and the second computerized device 140-2. For example, such a transfer may be conducted in the case of a failure of a network link in the first network 110 that initially carries a message 150-1 (or a stream of such messages) between the network 110 and the first communications device 120-1. By tunneling or transferring the message 150-2 from the second data communications device 120-2 to the first data communication device 120-1 to use the data path 162-1 through the first data communications device 120-1, to which the message 150-1 was originally targeted, further transmission of the message 150-2 can be conducted (i.e., over the remainder of the transmission path originally designated for the message 150-1).

In step 220, the data communications device (e.g., the second data communications device 150-2) operates a forwarding (e.g., tunneling) protocol to forward (e.g., tunnel) the message 150-2 from the second data communications device 120-2 to the first data communications device 120-1. Tunneling protocols can be used between two points such as the second data communications device 120-2 and first data communications device 120-1 in order to reduce resource requirements and/or maximize efficiency.

As an alternative to tunneling (Step 218), in step 222, the data communications device (e.g., the second data communications device 120-2) declines to forward each message of the first set of messages 150-2 (e.g., messages sent to the second data communications device 120-2 represented here as 150-2 of a stream that was originally routed to the first data communications device 120-1) received by the second data communications device 120-2 to the first computerized device operating in the second network. In other words, the second data communication device 120-2 drops the packets 150-2.

This is a feasible alternative for processing messages (e.g., packets) 150 that are sent using transmission protocols that repeat the transmission of messages (e.g., packets) 150 which fail to reach their destination. For example, if communications of a message 150-1 is re-routed in the first network 110 and is thus transmitted to the second data communications device 120-2, rather than forward the message 150-2 to the first data communications device 120-1 (as in steps 218, 220), the second data communications device may be configured to drop the packet 150-2.

In turn, components of the first network 110 such as the first computing device 140-1, having not received an acknowledgment from the second network 130 of having received the message 150-2, are configured to re-send the message 150-2 to its destination (e.g., to the second network 130). Transmission protocol operations may be configured in such a manner as to continue re-sending such messages 150 until finally receiving an acknowledgement from the receiving end after it receives the message 154-1. If the routing condition disappears or corrects itself in a short time, messages 150-1 will again be routed in the first network 110 to the first data communications device 120-1.

As another alternative, in step 224, the data communications device (e.g., the second data communications device 120-2) utilizes the data path 162-2 from the second data communications device 120-2 to transfer the message 150-2 from the network 110 to the second network 130 through the second data communications device 120-2. According to this alternative, the second data communications device 120-2, upon receiving a message or messages 150-2 (e.g., which the second data communications device 120-2 has already identified in step 214 as having been associated with the first data communications device 120-1) can obtain data path information 180 from the first data communications device 120-1 for use in establishing data path 162-2 for forwarding messages 150-2 and/or for the network address translation information (e.g., source, port and destination address information) needed by the second data communications device 120-2 to forward the message 150-2. Further details of the invention will now be provided with reference to FIG. 3.

Figure 3:
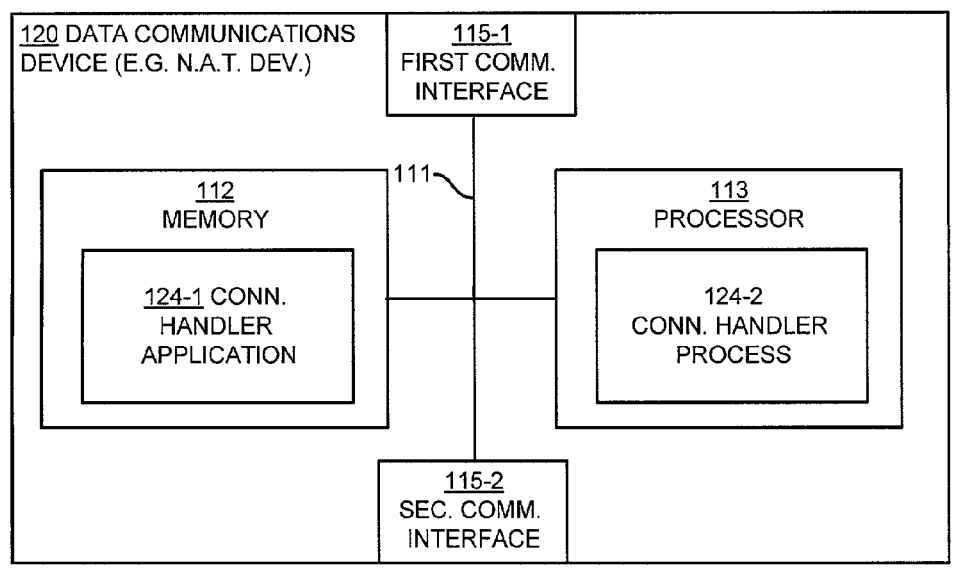
FIG. 3 depicts an example embodiment of the invention implemented using a general purpose computer to perform the functions of a data communications device (e.g., a network address translation device) according to one embodiment of the invention.

FIG. 3 depicts an example embodiment of the invention implemented using a general purpose computer 300 to perform the functions of a data communications device 120 (e.g., a data communications device or network address translation device). The example computer system 300 includes an interconnection mechanism 111 (e.g., a data bus and/or circuitry) which couples a memory 112 (e.g., any computer readable medium such as random access memory (RAM) and/or read only memory (ROM) or even a disk or storage medium) having a connection handler application 124-1, a processor 113 (e.g., a microprocessor or central processing unit) having a connection handler process 124-2, and a first and second communications interface 115-1, 115-2 (e.g., modem port or other network interface) for use in interfacing to a first and second network 110, 130. The connection handles applications 124-1 and correction handles process 124-2 are collectively represented by the connection handler 122 in other figures. Further details of the invention will now be provided with reference to FIG. 4.

Figure 4:
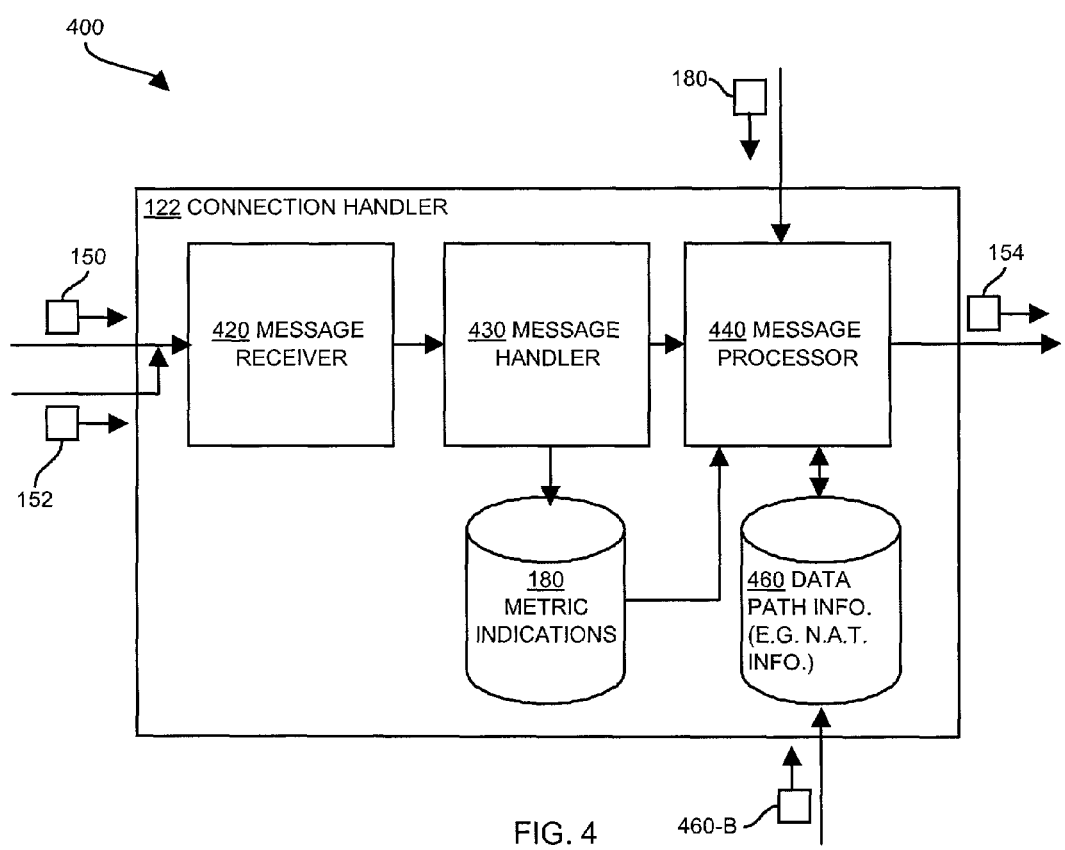
FIG. 4 is a diagram showing the components of the connection handler according to one embodiment of the invention.

FIG. 4 is a diagram 400 showing and example of the components of a connection handler 122 according to one embodiment of the invention. The connection handler 122 (e.g., connection handler 122-1 to 122-N of data communications device 120-1 to 120-N) includes a message receiver 420, message handler 430, message processor 440 metric indications 180, and local data path information 460-A (e.g. local data path information 460-A and remote data path information 460-B are referred to collectively as data path information 460). Associated with the connection handler 122 are also messages including a message 150 received from the first network 110, a forwarded (e.g., tunneled) message 152 received from another data communications device 120, a message 154 forwarded from the data communications device 120 to the second network 130 and remote data path information 460-B received from another data communications device 120.

The message receiver 420 receives messages 150 from the first network 110. In turn, the message handler 430 updates metric indications 180 (e.g., such as counts of messages 150 received for any source/destination combination) based on the received messages 150. The set of metric indications 180 may be stored in the form of a table which shows information as may be used for a network address translation but may also include metric indications (i.e., message counts), for example, as shown below:

| SOURCE ADD. | DATA COMMUNICATION DEVICE | | | | |
|---|---|---|---|---|---|
| | DCD 01 | DCD 02 | DCD 03 | ... | DCD N |
| 10.1/16 | 398 | 943645 | 5644 | ... | 398 |
| | 0/0 | 1/1 | 0/0 | | 0/0 |
| 10.2/16 | 586 | 78486 | 557 | ... | 248405 |
| | 0/0 | 0/0 | 0/0 | | 1/1 |
| ... | ... | ... | ... | ... | ... |
| 10.N/16 | 55 | 835 | 0 | ... | 32409 |
| | 0/0 | 0/0 | 0/0 | | 1/1 |

Metric Indications

The table above has a row corresponding to each source address range, with a limited number of source address ranges being obtained from a routing protocol such as open shortest path first (OSPF). For example, if a particular company has 50 locations, each with 3 LAN's, all using NAT, then the company might number these LAN's using address ranges like 10.1/16, 10.2/16, . . . 0.10.150/16 (e.g. where /16 indicates that this is a range of IP addresses where the first 16 bits are shown and the remaining bits may vary arbitrarily). In each such row, there are N columns, one for each of the data communications devices 120 (e.g. NAT gateways).

In each entry there is a metric (e.g. a packet or byte count) and a flag indicating if the data communications device 120 is the data communications device 120 agreed to be the designated NAT exit point for that source address range, and another flag to indicate if a data communications device 120 is the most-recent-previously-agreed exit point for such traffic. Thus the flags would indicate which data communications device 120 should be used for such traffic as well as what data communications device 120, having recently been so utilized, may contain NAT entries concerning recently active connections. Another alternative table is conceptually a three dimensional in which the third dimension lists possible destination (i.e. outside of the company) network ranges.

It should be understood that the above-described table is shown by way of example only. In an alternative arrangement, a data communications device 120 can combine data path information 460 (e.g., any NAT state for connections NAT'ed by this device 120) in addition to metric indications 180 within the same table. In other words, embodiments of the invention are not limited to operating data communications devices 120 that maintain tables in this configuration.

It is to be further understood that if a particular data communications device 120 does not yet have data path information 460 established for a particular connection (i.e., there is no NAT entry in this device 120 that relates to a message that this device just received), then that data communications device 120 can still maintain metric indications 180 indicating a number of messages 150 received that are associated with that connection since the connection information (but not the required NAT translation information) can be determined from the message 150 itself. In other words, according to the operation of embodiments of the invention, a data communications device such as the second data communications device 120-2 can maintain metric indications 180 that keep track of the count of the number of all messages 150, even though that second data communications device 120-2 has not yet established a connection through itself in the form all of a data path 162-2 (i.e., a NAT entry) for transfer of the message 150 between the first and second network 110 and 130. Such counts may be only periodically updated among data communications devices 120 to bring the data communications devices 120 into loose agreement among themselves.

As discussed in the aforementioned embodiments, the second data communications device 120-2 can receive such messages 150-2 that are associated with an already existing data path 162-1 in another device 120-1 (but due to a routing condition in the first network 110, the messages 150-2 arrive at the second data communications device 120-2) and can determine, based on the set of metric indications for a connection identified by this message 150-2, that the message count for the first data communications device 120-1 is the highest or preferred count of all other data communications devices 120 for messages associated with this connection. This is because the first data communications device 120-1 had been previously and continuously handling a first set of messages 150-1 associated with the connection between the first and second computing devices 140-1 and 140-2 prior to the occurrence of the routing condition within the first network 110.

The message processor 440 evaluates metric indications 180 compiled by the message handler 430 and data path information 460 which can also be obtained from other data communications devices 120. Further details of the invention will now be provided with reference to FIG. 5.

Figure 5:
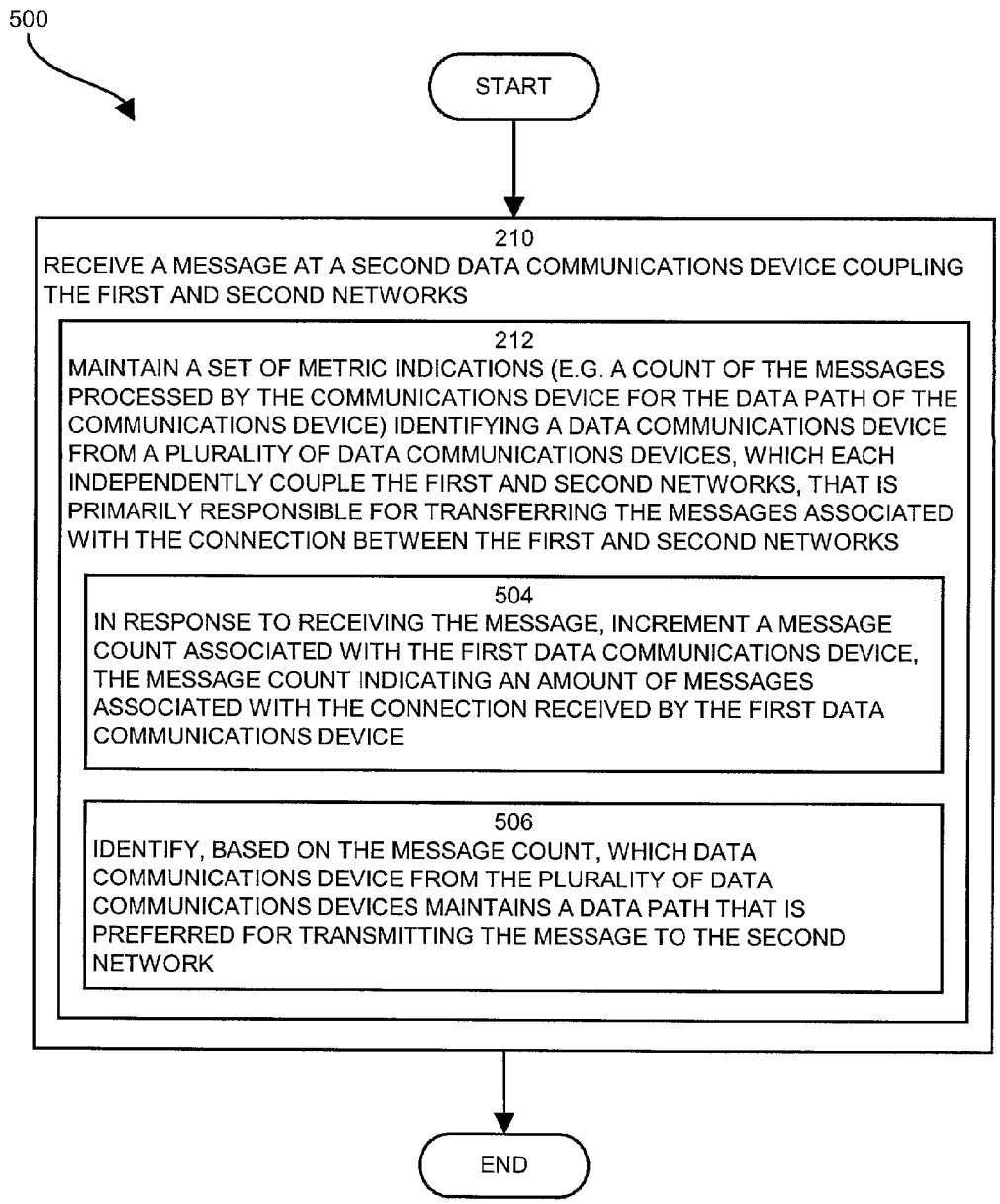
FIG. 5 is a flow chart showing additional details (i.e., identifying a data communications device based on a message count) of a procedure for receiving a message by a second data communications device coupling a first and second network according to one embodiment of the invention.

FIG. 5 is a flow chart showing additional details (i.e., identifying a data communications device based on a message count) of a procedure 500 for receiving a message 150-2 by a second data communications device 120-2 coupling a first and second network 110, 130 according to one embodiment of the invention.

In step 210, the second data communications device 120-2 coupling the first and second networks 110, 130 receives a message 150-1, as described earlier with respect to FIG. 2.

In step 212, the second data communications device 120-2 maintains a set of metric indications 180 (e.g., a count of the messages received by the data communications device 120-2 for particular connections identifying a data communications device 120 from a plurality of data communications devices 120-N, which each independently couple the first and second networks 110, 130, that is primarily responsible for transferring the messages 150 associated with the connection between the first and second networks 110, 130.

The metric indications 180 (e.g., transmission counts), for example, may be used by a data communications device 120 to determine which data communications device 120 is primarily responsible for communications between a particular source and destination in the first network 110 and second network 130 respectively. In this case, as shown by the example table above, the first data communications device 122-1 is preferred and has a data path 162-1 to communicate messages 150 between source 10.5 and destination 143.96.58.196.

In step 504, the second data communications device 120-2, in response to receiving the message 150-2, increments a message count (i.e., a metric indication from a set of metric indications 180) associated with the second data communications device 120-2. The message count indicates an amount of messages 150-2 associated with the connection that are received by the second data communications device 120-2.

A message count 180 may be a simple count of the number of messages 150 received by the second communications device 120-2 or other type of quantitative measure for a particular connection 170. The message count in the table example, above, is a simple decimal number. Other numbering schemes could be used as well.

In one embodiment of the invention, just as the second data communications device 120-2 maintains a count, the first data communications device 120-1 may also maintain a count that can be retrieved and used by the second data communications device 120-2 to determine which device 120 is preferred from all of the data communications devices 120.

In step 506, in one embodiment, the data communications device 120 identifies, based on the message count 180, which data communications device 120 from the plurality of data communications devices 120-1 to 120-N maintains a data path 162 that is preferred for transmitting the message 150 to the second network 130.

Data communications devices 120 may be configured to identify the preferred data communications device 120 based on past frequency of handling traffic between any particular two points (e.g., a connection) through a particular data communications device using message counts as recorded in the metric indications 180 (e.g., distributed and/or stored on one or more data communications devices 120, an example of which is provided above).

As shown in the example table above, a data communications device 120 may store information in its table (i.e., set of metric indications 450) obtained from other data communications devices 120 so that the data communications device 120 may evaluate the metric indications from tables of other data communications devices 120. In different embodiments of the invention a data communications device 120 may either be configured to hold pre-selected data path information (e.g., data paths and metric indications 180) from other data communications devices 120 or query the other data communications devices 120, as required, to identify alternative network path routings, at the time of receiving the messages 150-2 that need re-routing. Further details of the invention will not be provided with reference to FIG. 6.

Figure 6:
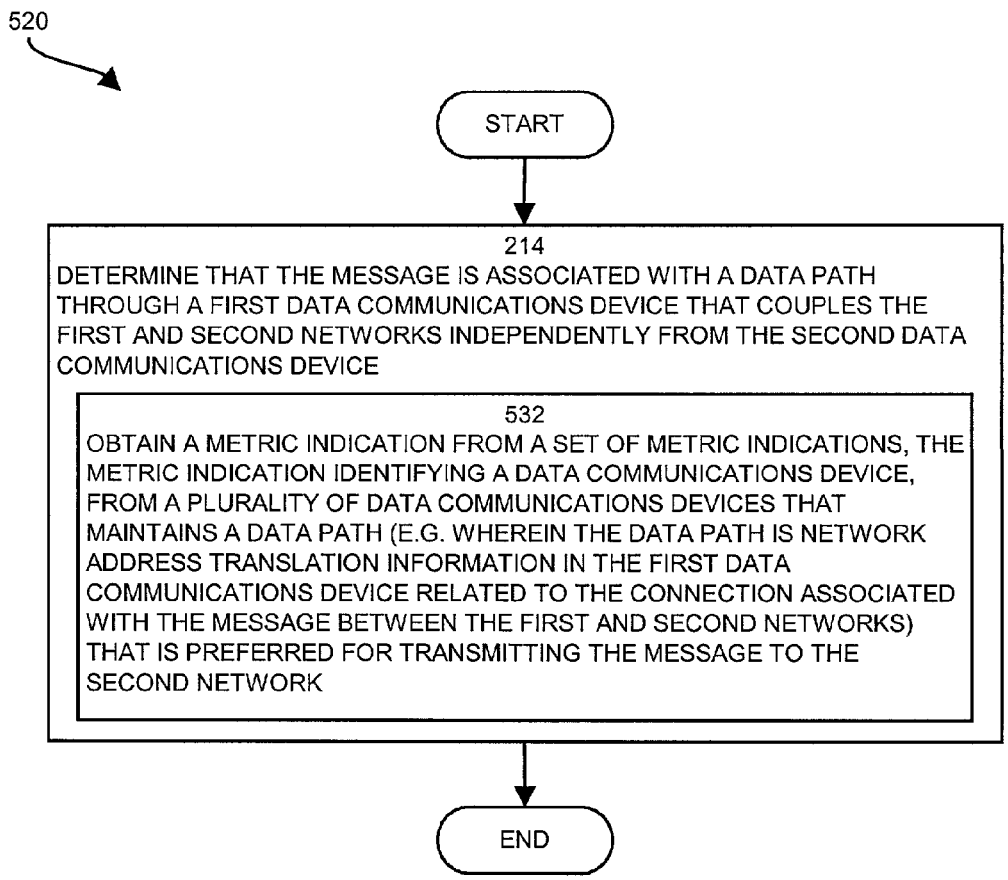
FIG. 6 is a flow chart of a procedure for determining that a message is associated with a data path through a first data communications device according to one embodiment of the invention.

FIG. 6 is a flow chart of a procedure 520 for determining that a message 150 is associated with a data path traveled by various messages 150 through another data communications device 120 according to one embodiment of the invention.

In step 214, the first data communications device 120-1 determines that the message 150-1 is associated with a data path 162-1 through a first data communications device 120-1 that couples the first and second networks 110, 130 independently from the second data communications device 120-1 as described earlier with respect to FIG. 2.

In step 532, the second data communications device 120-2 obtains a metric indication 180 from a set of metric indications 180 (e.g., distributed between all devices 120), the metric indication (e.g., individual metric indications 180 obtained from the first data communications device 120-1) identifies a data communications device 120, from a plurality of data communications devices 120-1 to 120-N) that maintains a data path traveled by various messages 150 (e.g., wherein the data path is network address translation information in the first data communications device 120-1 related to the connection associated with the message between the first and second networks) that is preferred for transmitting the message to the second network 130. The second data communications device 120-2 can retrieve data path information 162-1 (e.g., along with metric indications such as message counts 180 for device 120-1, See example table, above) from the first data communications device 120-1 for selecting from among multiple alternative data paths over which messages 150-2 can be forwarded, as described earlier in connection with the description of the example table depicted in the discussion of FIG. 4. Further details of the invention will not be provided with reference to FIG. 7.

Figure 7:
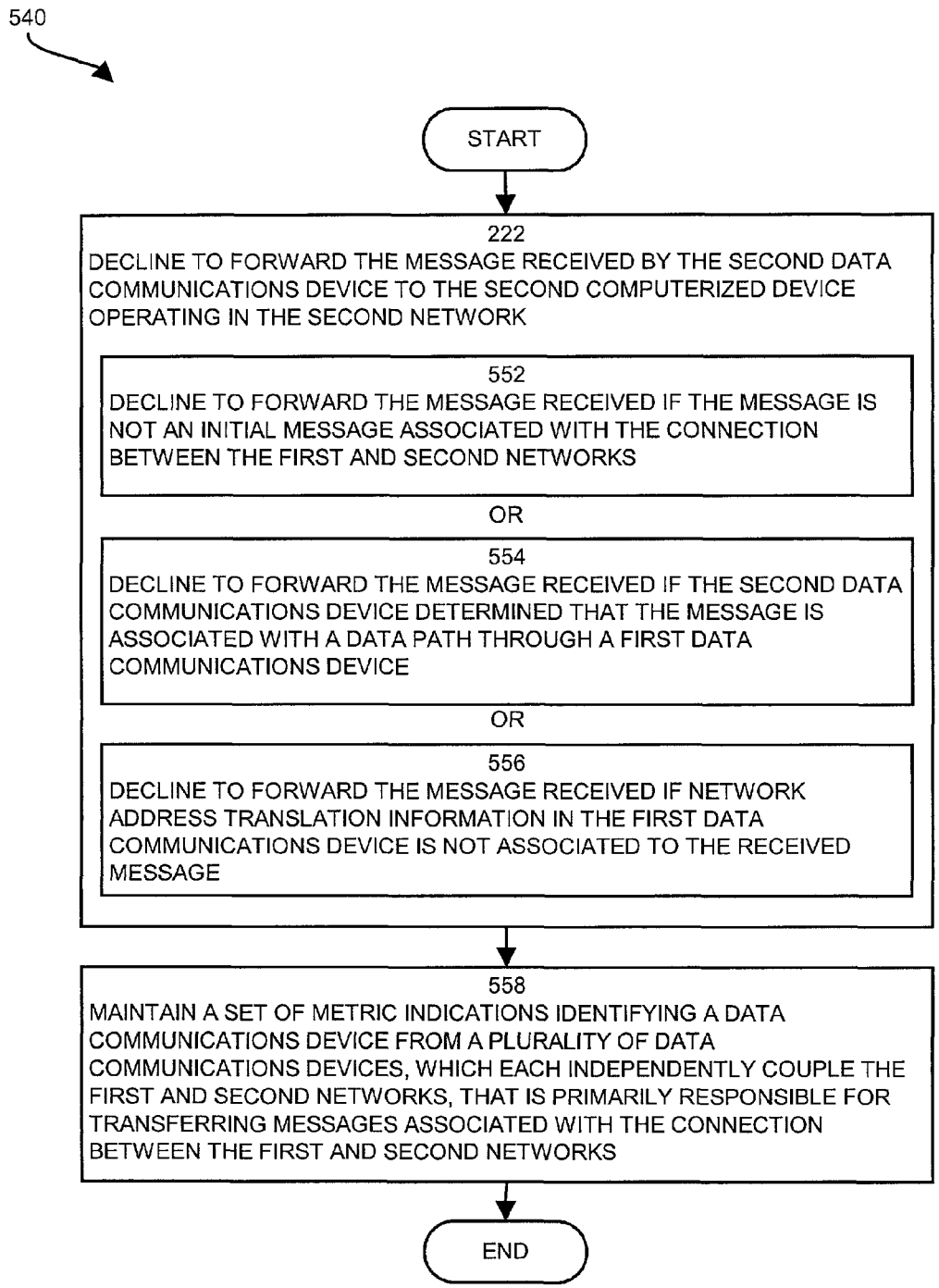
FIG. 7 is a flow chart of the details of a procedure for declining to forward a message received by a second data communications device to a first data communications device according to one embodiment of the invention.

FIG. 7 is a flow chart of the details of a procedure 222 for declining to forward a message 150-2 by a second communications device 120-2 to a first data communications device 120-1 according to one embodiment of the invention as described earlier with respect to FIG. 2.

In step 552, the second data communications device 120-2 declines to forward the message 120-2 received if the message 120-2 is not an initial message (e.g., the first message or packet of, for example, a connection 170 such as a TCP SYN packet) associated with the connection between the first and second networks 110, 130.

If a message 150-2 received by the second data communications device 120-2 is not the initial message (e.g., initial or TCP SYN packet), there is an increased likelihood that this message 150-2 is being re-routed due to a change in routing conditions. For example, if the second data communications device 120-2 receives a second or third packet of a transmission it is likely that the initial packet (e.g., message 150-1) was transmitted to another data communications device (e.g., the first data communications device 120-1) and that a change in routing has since occurred to the first data communications device 120-1.

If packets or messages are dropped thus dropped at non-preferred devices, the source point must re-send missing packets, etc. By declining to process any messages received by the second data communications device 120-2, which the second data communications device 120-2 identifies are not initial messages, the originator may re-send them at a time after the change in routing conditions disappears.

As described earlier in step 222, messages 150 that the second data communications device 120-2 declines to forward (e.g., drops), after timing out will be identified at the receiving end and resent by operation of the underlying transmission protocol.

As an alternative to step 552, in step 554, the second data communications device 120-2 declines to forward the message 150-2 received if the second data communications device 120-2 determined that the message is associated with a data path through a first data communications device 120-1. According to this alternative, the second data communications device 120-2 does not forward any messages 150 other than those for which the second data communications device 120-2 is preferred. Messages 150 received for connections preferred by the first data communications device 150-1 or another data communications device are dropped. Again, as described earlier in step 222, messages 150 that the second data communications device 120-2 declines to forward (e.g., drops), after timing out, will be identified at the receiving end and re-sent by operation of the underlying transmission protocol and the routing conditions may have corrected themselves.

As another alternative to steps 552 and 554, in step 556, the second data communications device 120-2 declines to forward the message 150-2 received if network address translation information in the second data communications device 120-2 is not associated to the received message. If the second data communications device 120-2 does not contain data path information (e.g., network address translation information) the message 150-2 will not be forwarded, but instead dropped. In other words, lacking information with which to forward messages 150-2 to the second network 130, the a second data communications device 120-2 will drop those messages 150-2. Once more, as described earlier in step 222, messages 150 that the second data communications device 120-2 declines to forward (e.g., drops), after timing out, will be identified at the receiving end and re-sent by operation of the underlying transmission protocol.

The second data communications device 120-2 may decline to forward messages 150 for any one of the three alternatives described above. Once a message 150 has been dropped, step 558 is performed.

In step 558, the second data communications device 150-2 maintains a set of metric indications 180 identifying a data communications device 150 from a plurality of data communications devices 150-1 to 150-N, which each independently couple the first and second networks, that is primarily responsible for transferring messages 150 associated with the connection between the first and second networks 110, 130. In other words, the device 120 updates a message count even though one of steps 552, 554 and 556 drops the received message 150.

The table also includes a metric indications (e.g., such as message counts; See example table shown in description of FIG. 4) that can be evaluated by the second data communications device 120-in order to determine which data communications device (e.g., of a multiple of data communications devices 150) is primarily responsible for transferring messages associated with the connection between the first and second networks 110, 130. Accordingly, a second data communications device 120-2 may determine that it is the appropriate data communications device 120 to forward the message 150-2 received, and thus forward the message(s) 150-2.

Figure 8:
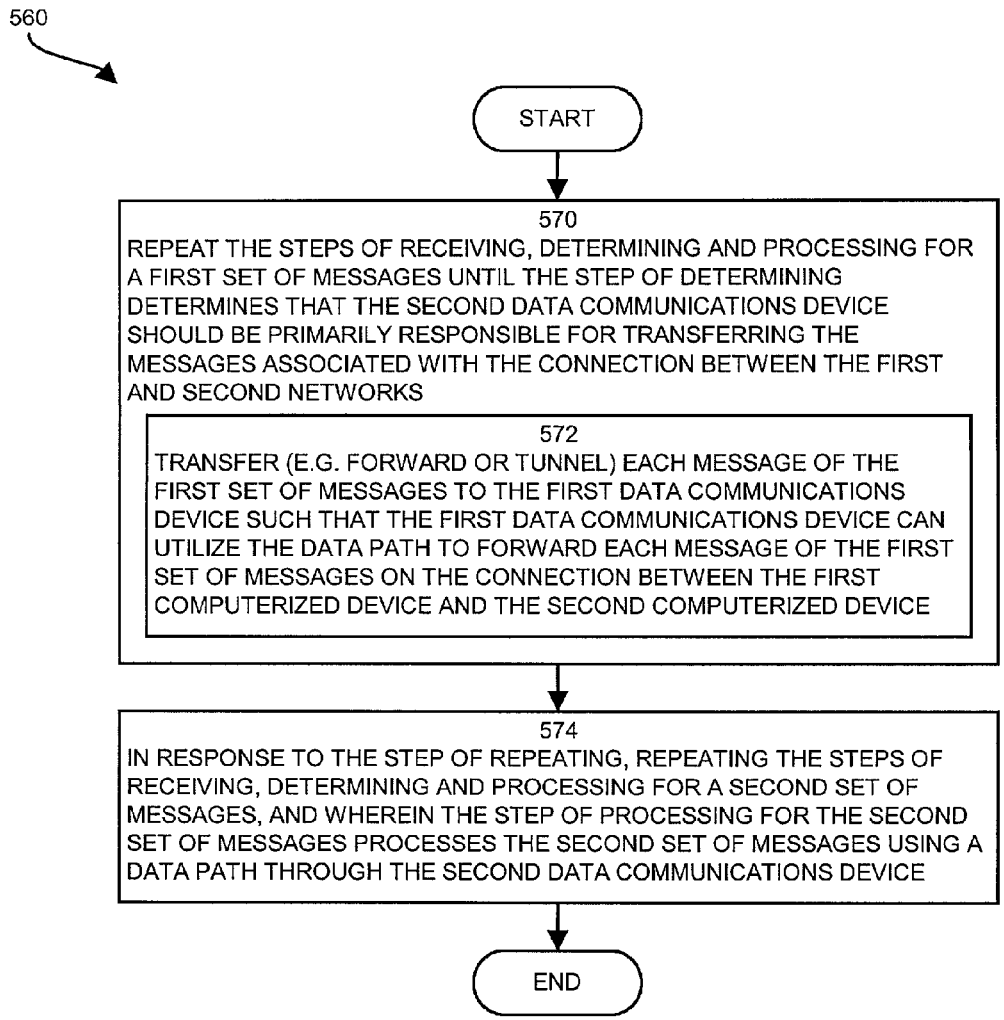
FIG. 8 is a flow chart of a procedure for determining that a data communications device is primarily responsible for transferring additional messages associated with a connection between a first and second network according to one embodiment of the invention.

FIG. 8 is a flow chart of a procedure 560 for processing messages associated with the connection between a first and second network according to another embodiment of the invention.

In step 570, the second data communications device 120-2 repeats the steps of receiving (e.g., in step 210 in FIGS. 2 and 5), determining (e.g., step 214 in FIGS. 2 and 6) and processing (e.g., tunneling or dropping as in step 216 in FIG. 2) for a first set of messages 150 until the step of determining determines that the second data communications device 120-2 should be primarily responsible for transferring the messages 150 associated with the connection between the first and second networks 110, 130. In other words, the second data communications device 120-2 has determined, after repeatedly receiving, determining and processing messages 150 that the second data communications device 120-2 is now the best data communications device 120 for processing messages 150 between any particular message 150 source and destination. For example, the data communications device 150 may use a predetermined threshold related to the metric indication to determine that enough messages have been forwarded through the second data communications device 150-2 that the second data communications device 120-2 should become the data communications device 150 that is primarily responsible for transferring messages associated with the particular connection.

In an alternative, the second data communications device 120-2 may compare message counts for itself to message counts for other data communications devices 120 in order to determine which data communications device 120 should be primarily responsible for transferring the messages 150 between the first and second networks 110, 130.

In step 572, the second data communications device 120-2 transfers (e.g., forwards or tunnels) each message of the first set of messages 150 to the first data communications device 120-1 such that the second data communications device 120-2 can utilize the data path 162-1 to forward each message of the first set of messages 150 on the connection between the first computerized device 140-1 and the second computerized device 140-2.

Thereafter, as long as the second data communication device 120-2 continues to receive messages 150 for which the second data communications device 120-2 should be primarily responsible, the second data communications device will continue to forward each message 150 between the particular first computerized device 140-1 and second computerized device having 140-2.

In step 574, in response to the step of repeating, the second data communications device 120-2 repeats the steps of receiving, determining and processing for a second set of messages 150. With respect to the step of processing for the second set of messages, 150, the second data communications device 120-2 processes the second set of messages 150-2 using a data path 162-2 through the second data communications device 150-2. In other words, after repeatedly receiving, determining and processing for a first set of messages 150, in this step, the second data communications device 150-2 identifies that it is designated as the preferred device 120.

Figure 9:
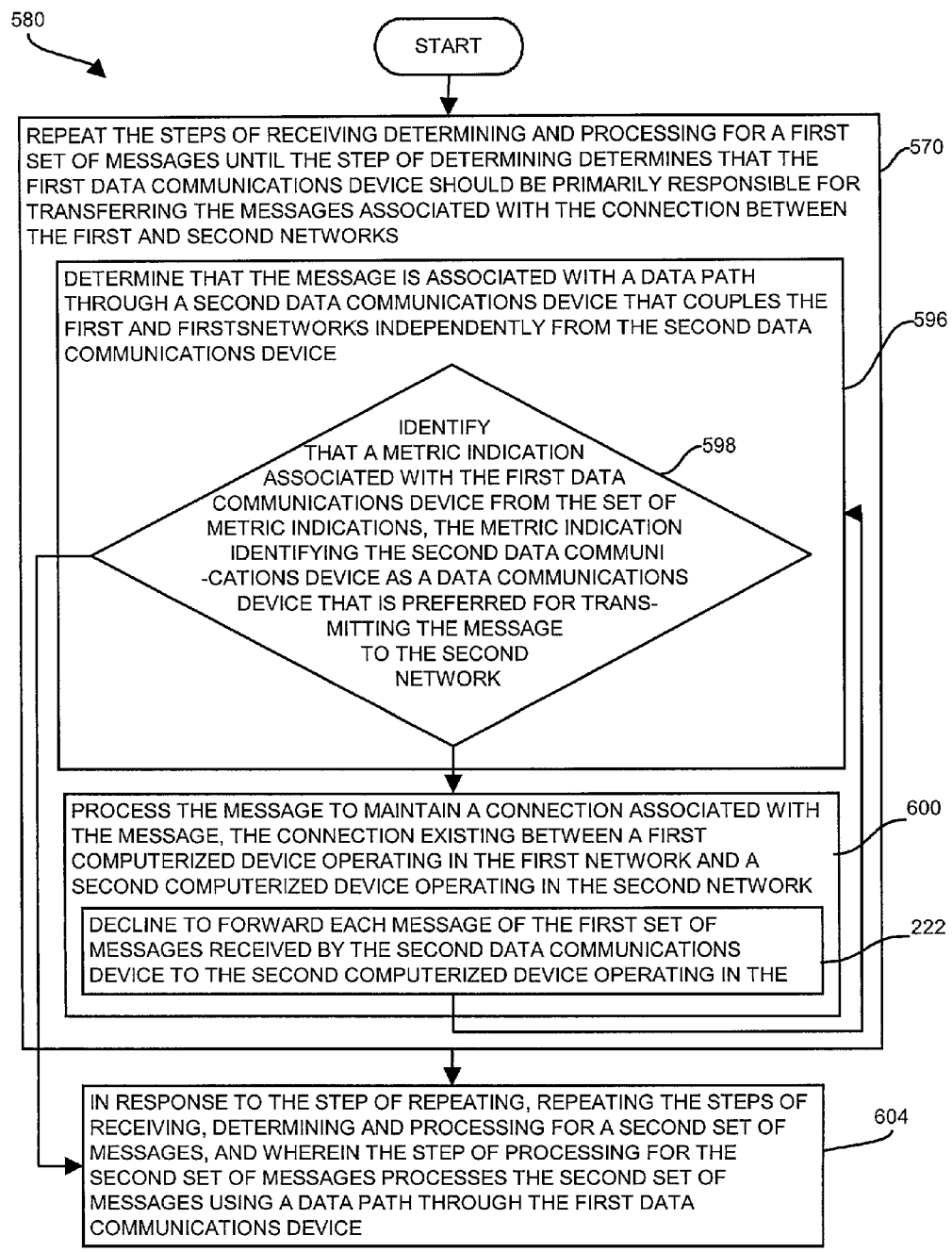
FIG. 9 is a flow chart of the details of a procedure for determining that a message is associated with a data path through a second data communications device according to one embodiment of the invention.

FIG. 9 is a flow chart of the details of another procedure 580 for determining that a message is associated with a data path through a second data communications device according to one embodiment of the invention.

In step 570, the data communications device repeats the steps of receiving determining and processing for a first set of messages until the step of determining determines that the first data communications device should be primarily responsible for transferring the messages associated with the connection between the first and second networks.

In step 596, the data communications device determine that the message is associated with a data path through a second data communications device that couples the first and second networks independently from the first data communications device.

In step 598, the data communications device identifies that a metric indication associated with the first data communications device from the set of metric indications, the metric indication identifying the first data communications device as a data communications device that is preferred for transmitting the message to the second network.

In step 600, the data communications device processes the message to maintain a connection associated with the message, the connection existing between a first computerized device operating in the first network and a second computerized device operating in the second network.

In step 602, the data communications device declines to forward each message of the first set of messages received by the first data communications device to the second computerized device operating in the second network.

In step 604, in response to the step of repeating, the data communications device repeats the steps of receiving, determining and processing for a second set of messages, and wherein the step of processing for the second set of messages processes the second set of messages using a data path through the first data communications device.

While this invention has been particularly shown and described with references to preferred embodiments thereof, it will be understood by those skilled in the art that various changes in form and details may be made therein without departing from the spirit and scope of the invention.

As an example, a second data communications device 120-2 may use other approaches to handling messages 150-2 (e.g. packets). In one instance, upon receipt of messages 150 from the first computerized device 140-1, the second data communications device 120-2 randomly chooses whether to drop or tunnel (e.g. tunnel to the first data communications device 120-1). The second data communications device 120-1 may be configured to choose dropping versus tunneling according to a probability factor that ensures that some packets are successfully transmitted so that a TCP session stays alive. Equivalently, the probability can be selected to ensure that some packets are dropped, which will slow down the TCP session significantly, reducing the load on the tunnel path 152.

In another example, messages 150-2 are queued for transmission to the first communications device 120-1, using a tunnel or other variation. However, the queue may be restricted to a limited bandwidth rate of transmission, such as, for example, according to random early detection (i.e. RED) or weighted random early detection (i.e. WRED) techniques.

It should also be understood that the methods described herein can be applied concurrently in parallel and independently by data communications device 120 to all traffic that the data communications device 120 are handling, grouped by connection, traffic type, source/destination IP address prefixes associated with different routing paths. Data communications devices 120 also carry out the steps of this invention independently with respect to portions of the aggregate traffic corresponding to the various address ranges indicated by the usual IP routing tables (e.g. as might be maintained by border gateway protocol (BGP), open shortest path first (OSPF) or other standards routing protocols).

What is claimed is:

1. A method for processing messages to be transferred from a first network to a second network, the method comprising the steps of:
   receiving a message at a second data communications device coupling the first and second networks;
   determining, in the second data communications device, that the message is associated with a data path through a first data communications device that couples the first and second networks independently from the second data communications device; and
   processing the message to maintain a connection associated with the message, the connection existing between a first computerized device operating in the first network and a second computerized device operating in the second network, by transferring the message from the second data communications device to the first data communications device such that the first data communications device can utilize the data path to forward the message on the connection between the first computerized device and the second computerized device.

2. The method of claim 1 wherein the step of transferring comprises the step of:
   operating a forwarding protocol to forward the message from the second data communications device to the first data communications device.

3. The method of claim 1 wherein the step of receiving comprises the step of:
   maintaining a set of metric indications identifying a data communications device from a plurality of data communications devices, which each independently couple the first and second networks, that is primarily responsible for transferring the messages associated with the connection between the first and second networks.

4. The method of claim 3 wherein a metric indication of the set of metric indications is a count of the messages processed by the data communications device of the data path for the communications device.

5. The method of claim 4 wherein the step of maintaining comprises the step of:
in response to receiving the message, incrementing a message count associated with the second data communications device, the message count indicating an amount of messages associated with the connection received by the second data communications device.

6. The method of claim 4 wherein, the message count indicating an amount of messages associated with the connection received by the first data communications device, the step of determining comprises:
identifying, based on the message count, which data communications device from the plurality of data communications devices maintains a data path that is preferred for transmitting the message to the second network.

7. The method of claim 1 comprising the steps of:
repeating the steps of receiving, determining and processing for a first set of messages until the step of determining determines that the second data communications device should be primarily responsible for transferring the messages associated with the connection between the first and second networks; and
in response to the step of repeating, repeating the steps of receiving, determining and processing for a second set of messages, and wherein the step of processing for the second set of messages processes the second set of messages using a data path through the second data communications device.

8. The method of claim 7 wherein the step of processing for the first set of messages comprises the step of:
transferring each message of the first set of messages to the first data communications device such that the first data communications device can utilize the data path to forward each message of the first set of messages on the connection between the first computerized device and the second computerized device.

9. The method of claim 7 wherein the step of processing for the first set of messages comprises the step of:
declining to forward each message of the first set of messages received by the second data communications device to the second computerized device operating in the second network.

10. The method of claim 7 wherein the step of receiving comprises the step of:
maintaining a set of metric indications identifying a data communications device from a plurality of data communications devices, which each independently couple the first and second networks, that is primarily responsible for transferring the messages associated with the connection between the first and second networks; and
wherein the step of determining that determines that the second data communications device should be primarily responsible for transferring the messages associated with the connection between the first and second networks comprises the step of:
identifying that a metric indication associated with the second data communications device from the set of metric indications, the metric indication identifying the second data communications device as a data communications device that is preferred for transmitting the message to the second network.

11. The method of claim 1, wherein the step of determining comprises the step of:
obtaining a metric indication from a set of metric indications, the metric indication identifying a data communications device, from a plurality of data communications devices that maintains a data path that is preferred for transmitting the message to the second network.

12. The method of claim 11 wherein the data path is network address translation information in the first data communications device related to the connection associated with the message between the first and second networks.

13. The method of claim 1 wherein the step of processing comprises:
declining to forward the message received by the second data communications device to the second computerized device operating in the second network.

14. The method of claim 13 wherein the step of declining comprises:
declining to forward the message received if the message is not an initial message associated with the connection between the first and second networks.

15. The method of claim 13 wherein the step of declining comprises:
declining to forward the message received if the second data communications device determines that the message is associated with a data path through a first data communications device.

16. The method of claim 13 wherein the data communications device uses network address translation and wherein the step of declining comprises:
declining to forward the message received if network address translation information in the second data communications device is not associated to the received message.

17. The method of claim 13 further comprising the step of:
maintaining a set of metric indications identifying a data communications device from a plurality of data communications devices, which each independently couple the first and second networks, that is primarily responsible for transferring messages associated with the connection between the first and second networks.

18. The method of claim 1 wherein the step of processing includes the step of randomly performing one of:
transferring the message to the first data communications device such that the first data communications device can utilize the data path to forward the message on the connection between the first computerized device and the second computerized device; and
declining to forward the message received by the second data communications device to the second computerized device operating in the second network.

19. The method of claim 1 wherein the step of processing includes the step of:
delaying transferring the message to the first data communications device by an amount of time such that messages transferring to the first data communications device do not exceed a selected volume.

20. The method of claim 1 wherein the step of processing comprises the step of:
utilizing network address translation connection state data from the first data communications device to transfer the message from the first network to the second network through the second data communications device.

21. A first data communications device comprising:
at least one communications interface capable of coupling the data communications device to a first and second network;
a memory;
a processor; and
an interconnection mechanism coupling the at least one communications interface, the memory and the processor;

wherein the memory is encoded with a connection handler application that when performed on the processor, produces a connection handler process that causes the data communications device to process messages to be transferred from the first network to the second network by performing the operations of:

receiving a message at the at least one communications interface;

determining, in the first data communications device, that the message is associated with a data path through a second data communications device that couples the first and second networks independently from the first data communications device; and processing the message to maintain a connection associated with the message, the connection existing between a first computerized device operating in the first network and a second computerized device operating in the second network, by transferring the message from the first data communications device to the second data communications device such that the second data communications device can utilize the data path to forward the message on the connection between the first computerized device and the second computerized device.

22. The data communications device of claim 21 wherein when the data communications device performs the operation of transferring, the data communications device performs the operation of:

operating a tunneling protocol to tunnel the message from the first data communications device to the second data communications device.

23. The data communications device of claim 21 wherein when the data communications device performs the operation of receiving, the data communications device performs the operation of:

maintaining a set of metric indications identifying a data communications device from a plurality of data communications devices, which each independently couple the first and second networks, that is primarily responsible for transferring the messages associated with the connection between the first and second networks.

24. The data communications device of claim 23 wherein a metric indication of the set of metric indications is a count of the messages processed by the communications device of the data path for the communications device.

25. The data communications device of claim 24 wherein when the data communications device performs the operation of maintaining, the data communications device, in response to receiving the message, performs the operation of:

incrementing a message count associated with the first data communications device, the message count indicating an amount of messages associated with the connection received by the first data communications device.

26. The data communications device of claim 24 wherein the message count indicating an amount of messages associated with the connection received by the first data communications device, when the data communications device performs the operation of determining, the data communications device performs the operation of:

identifying, based on the message count, which data communications device from the plurality of data communications devices maintains a data path that is preferred for transmitting the message to the second network.

27. The data communications device of claim 21 wherein the data communications device performs the operation of:

repeating the steps of receiving, determining and processing for a first set of messages until the step of determining determines that the first data communications device should be primarily responsible for transferring the messages associated with the connection between the first and second networks; and in response to the step of repeating, repeating the steps of receiving, determining and processing for a second set of messages, and wherein the step of processing for the second set of messages processes the second set of messages using a data path through the first data communications device.

28. The data communications device of claim 27 wherein when the data communications device performs the operation of processing for the first set of messages, the data communications device performs the operation of:

transferring each message of the first set of messages to the second data communications device such that the second data communications device can utilize the data path to forward each message of the first set of messages on the connection between the first computerized device and the second computerized device.

29. The data communications device of claim 27 wherein when the data communications device performs the operation of processing for the first set of messages, the data communications device performs the operation of:

declining to forward each message of the first set of messages received by the first data communications device to the second computerized device operating in the second network.

30. The data communications device of claim 27 wherein when the data communications device performs the operation of receiving the data communications device performs the operation of:

maintaining a set of metric indications identifying a data communications device from a plurality of data communications devices, which each independently couple the first and second networks, that is primarily responsible for transferring the messages associated with the connection between the first and second networks; and when the data communications device performs the operation of determining that determines that the first data communications device should be primarily responsible for transferring the messages associated with the connection between the first and second networks, the data communications device performs the operation of:

identifying that a metric indication associated with the first data communications device from the set of metric indications, the metric indication identifying the first data communications device as a data communications device that is preferred for transmitting the message to the second network.

31. The data communications device of claim 21 wherein the data communications device performs the operation of:

obtaining a metric indication from a set of metric indications, the metric indication identifying a data communications device, from a plurality of data communications devices that maintains a data path that is preferred for transmitting the message to the second network.

32. The data communications device of claim 31 wherein the data path is network address translation information in the second data communications device related to the connection associated with the message between the first and second networks.

33. The data communications device of claim 21 wherein when the data communications device performs the operation of processing, the data communications device performs the operation of:

declining to forward the message received by the first data communications device to the second computerized device operating in the second network.

34. The data communications device of claim 33 wherein when the data communications device performs the operation of declining, the data communications device performs the operation of:
   declining to forward the message received if the message is not an initial message associated with the connection between the first and second networks.

35. The data communications device of claim 33 wherein when the data communications device performs the operation of declining, the data communications device performs the operation of:
   declining to forward the message received if the first data communications device determines that the message is associated with a data path through a second data communications device.

36. The data communications device of claim 33 wherein when the data communications device uses network address translation and wherein when the data communications device performs the operation of declining, the data communications device performs the operation of:
   declining to forward the message received if network address translation information in the first data communications device is not associated to the received message.

37. The data communications device of claim 33 wherein the data communications device performs the operation of:
   maintaining a set of metric indications identifying a data communications device from a plurality of data communications devices, which each independently couple the first and second networks, that is primarily responsible for transferring messages associated with the connection between the first and second networks.

38. The data communications device of claim 21 wherein when the data communications device performs the operation of processing, the data communications performs the operation of:
   randomly performing one of transferring the message to the first data communications device such that the first data communications device can utilize the data path to forward the message on the connection between the first computerized device and the second computerized device; and
   declining to forward the message received by the second data communications device to the second computerized device operating in the second network.

39. The data communications device of claim 21 wherein when the data communications device performs the operation of processing, the data communications device performs the operation of:
   delaying transferring the message to the first data communications device by an amount of time such that messages transferred to the first data communications device do not exceed a selected volume.

40. The data communications device of claim 21 wherein when the data communications device performs the operation of processing, the data communications device performs the operation of:
   utilizing network address translation connection state data from the first data communications device to transfer the message from the first network to the second network through the second data communications device.

41. A computer program product stored on a non-transitory computer readable medium, the computer-readable medium including computer program logic encoded thereon that, when performed on a processor in a computerized device having a coupling of a memory, a processor, and at least one communications interface, processes messages to be transferred from a first network to a second network, the computer program product comprising:
   computer program code for receiving a message at a second data communications device coupling the first and second networks;
   computer program code for determining, in the second data communications device, that the message is associated with a data path through a first data communications device that couples the first and second networks independently from the second data communications device; and
   computer program code for processing the message to maintain a connection associated with the message, the connection existing between a first computerized device operating in the first network and a second computerized device operating in the second network, by transferring the message from the second data communications device to the first data communications device such that the first data communications device can utilize the data path to forward the message on the connection between the first computerized device and the second computerized device.

42. The computer program product of claim 41 wherein computer program code for processing comprises:
   computer program code for utilizing network address translation connection state data from the first data communications device to transfer the message from the first network to the second network through the second data communications device.

* * * * *